United States Patent [19]

Hurinville

[11] Patent Number: 5,025,453
[45] Date of Patent: Jun. 18, 1991

[54] METHOD OF MEASURING THE SIGNATURE OF DIGITAL TRANSMISSION EQUIPMENT, AND APPARATUS FOR IMPLEMENTING SUCH A METHOD

[75] Inventor: Bertrand Hurinville, Levallois-Perret, France

[73] Assignee: Alcatel Transmission par Faisceaux Hertziens, Cedex, France

[21] Appl. No.: 450,191

[22] Filed: Dec. 13, 1989

[30] Foreign Application Priority Data

Dec. 15, 1988 [FR] France .................. 88 16558

[51] Int. Cl.[5] ............................................ H04B 17/00
[52] U.S. Cl. ........................................ 375/10; 371/5.1;
  371/20.1; 364/724.01; 375/60
[58] Field of Search ................... 371/5.1, 5.5, 20.1,
  371/23, 28; 375/10, 60, 96, 101, 103, 58;
  370/13; 455/67; 364/724.01, 724.06, 724.15,
  724.19; 342/93

[56] References Cited

U.S. PATENT DOCUMENTS

| 3,761,825 | 9/1973 | Hill ............................................ 375/10 |
| 4,309,771 | 1/1982 | Wilkens ................................... 371/5.5 |
| 4,543,066 | 9/1985 | French ..................................... 375/10 |
| 4,654,851 | 3/1987 | Busby ...................................... 371/28 |
| 4,905,172 | 2/1990 | Randle .................................. 371/20.1 |

FOREIGN PATENT DOCUMENTS

3619175 12/1987 Fed. Rep. of Germany .

OTHER PUBLICATIONS

International Conference of Measurements for Telecommunications Transmission Systems, MTTS'85, 1985, No. 286, pp. 108-111; G. D. Richman: "Automated signature measurement of operational microwave radio-relay equipment using a novel multipath simulator".

L'onde Electrique, vol. 66, No. 2, Mar. 1986, pp. 124-129, Paris, France; O. Toutan et al.: "Auto-adaptive dans les faisceaux hertziens numeriques".

Communication & Transmission, vol. 7, No. 1, Apr. 1985, pp. 5-30, Paris, France; J. M. Beddok et al.: "Transmissions a 140 Mbit/s par faisceaux hertziens a 6 et 11 GHz".

*Primary Examiner*—Benedict V. Safourek
*Attorney, Agent, or Firm*—Sughrue,Mion,Zinn,Macpeak & Seas

[57] ABSTRACT

A method of measuring the signature of digital transmission equipment, in which the measurement can be performed during operation without adding special apparatus, and in which: the digital filtering on transmission is varied in order to simulate multiple paths; and the depth of fading is varied at each of a plurality of frequencies until a predetermined error rate is obtained. The invention also provides apparatus for implementing the method. The invention is particularly suitable for use with digital radio links.

3 Claims, 3 Drawing Sheets

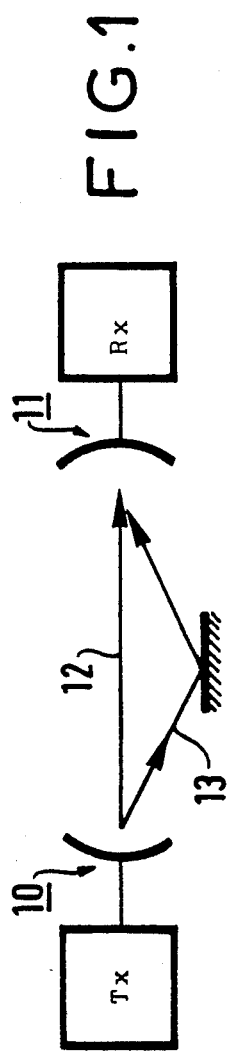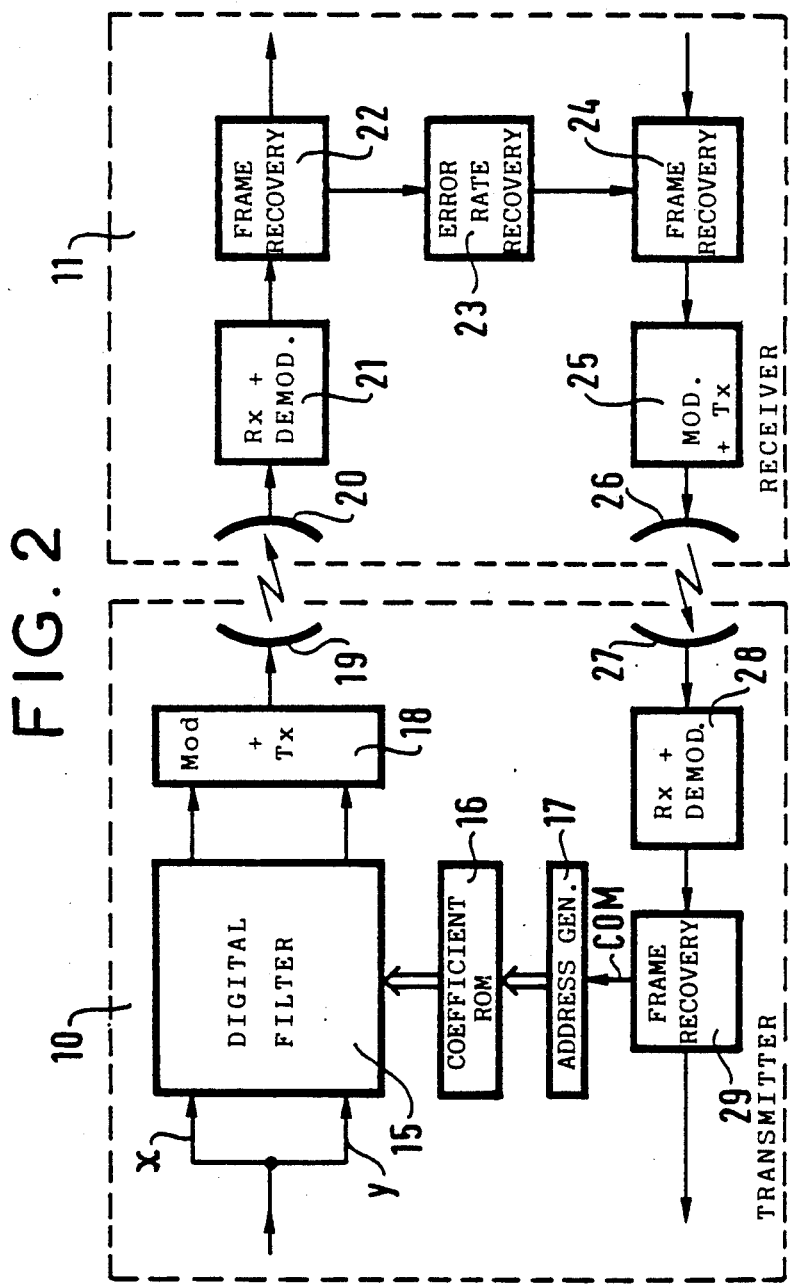

METHOD OF MEASURING THE SIGNATURE OF DIGITAL TRANSMISSION EQUIPMENT, AND APPARATUS FOR IMPLEMENTING SUCH A METHOD

The invention relates to a method of measuring the signature of digital transmission equipment, and to apparatus for implementing such a method.

The invention relates more particularly to signature measurement performed on digital radio beams in operation.

BACKGROUND OF THE INVENTION

When transmitting high data rate digital signals, certain phenomena related to the propagation of these signals may disturb the transmission and thus give rise to errors in the transmitted message. A signature measurement serves to qualify how well a radio link, for example, will withstand this type of propagation defect which is attributed to "multiple paths" that appear when a transmitted radio signal follows a plurality of propagation paths. In general, in order to use this signature measurement, use is made of a "two path" model.

In an article published in "International Conference on Measurements for Telecommunication Transmission Systems" MTTS 85 (conference publication No. 286), entitled "Automated Signature Measurement of Operational Microwave Radio-relay Equipment Using a Noval Multipath Simulator", G. D. Richman of British Telecommunications Research Laboratories, U.K., present knowledge relating to multiple paths, to signature measurements, and to multipath simulators is described. The purpose of such simulators is to produce static and dynamic test conditions for fully characterizing the capacity of digital equipment to attenuate distortion due to abnormal propagation effects.

Thus, in the prior art, use is made of a multipath simulator which may operate either in baseband, or at intermediate frequency, or at microwave frequency. These various types of construction suffer from various drawbacks, such as:

in baseband, the analog multipliers used in such a simulator need to be reliable over a wide bandwidth and they need to be insensitive to temperature;

at intermediate frequency, the main problem relates to the phase shifter used in the simulator which must be a wideband phase shifter; and at microwave frequency, the equipment is often bulky and expensive.

In all cases, a multipath simulator is a complex and expensive apparatus that needs to be installed on a link each time it is desired to measure the signature of a piece of equipment.

The object of the invention is to mitigate these drawbacks.

SUMMARY OF THE INVENTION

To this end, the invention proposes a method of measuring the signature of digital transmission equipment, wherein:

the digital filtering on transmission is varied in order to simulate multiple paths; and the depth of fading is varied at each of a plurality of frequencies until a predetermined error rate is obtained.

Such a method has the advantage of being capable of measuring the signature of a leg in a radio link at any time, without requiring multipath simulator apparatus to be used.

BRIEF DESCRIPTION OF THE DRAWINGS

An embodiment of the invention is described by way of example with reference to the accompanying drawings, in which:

FIG. 1 is a diagram showing the transmission of a digital signal between two stations;

FIGS. 2 and 3 illustrate the operation of the method of the invention; and

DETAILED DESCRIPTION

Figure 3:
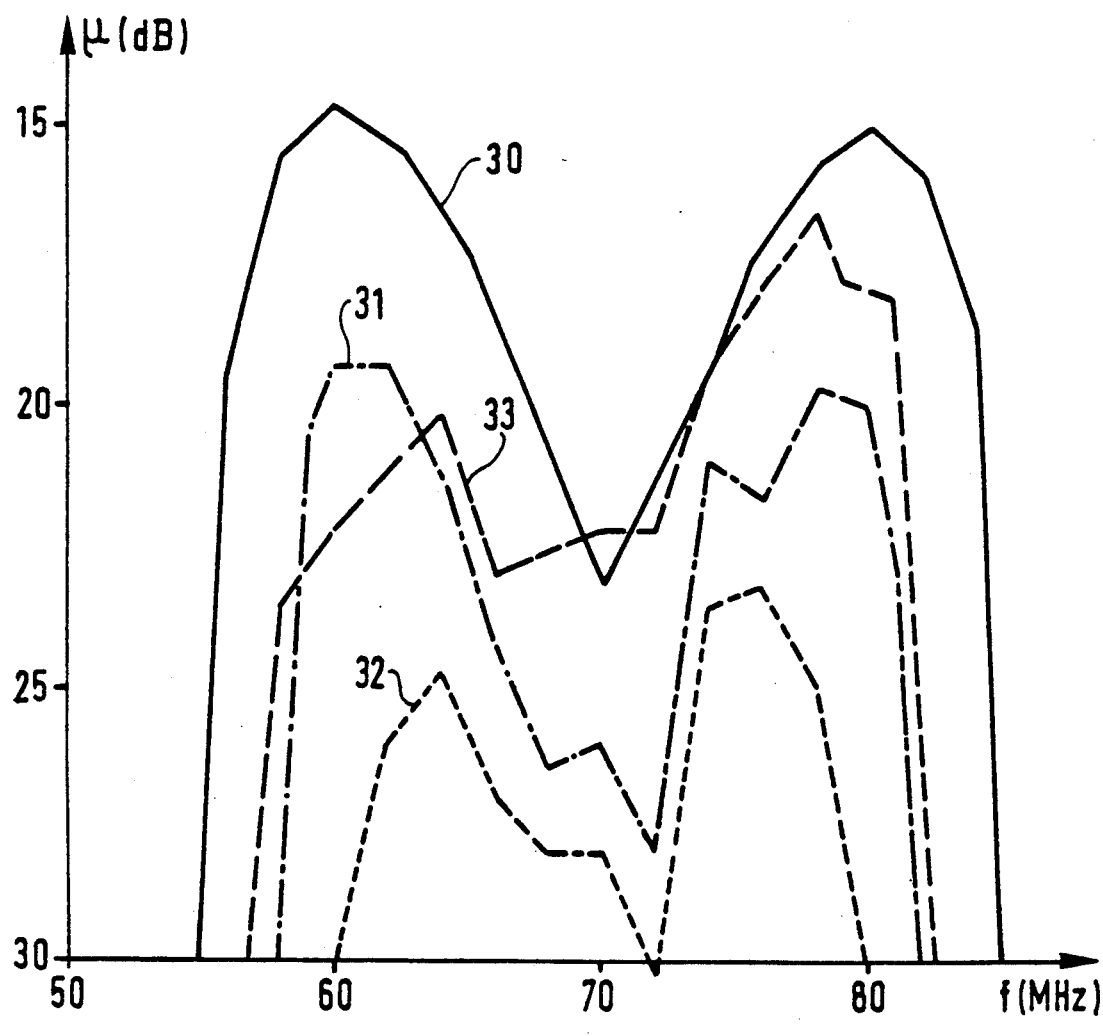

With reference to the diagrammatic representation of a digital transmission system shown in FIG. 1, there are:

a transmitter station 10;
a receiver station 11;
a direct path 12 for the signal emitted by the station 10; and
a reflected path 13 for the signal emitted by the station 10.

The transfer function of such a transmission channel can be written as follows:

$$H(w) = A(1 = \mu e^{u(\phi - w\tau)})$$

where:

A = flat attenuation;
$\tau$ = relative delay between the two paths (generally about 6.3 ns)
$(\phi,\mu)$ = characteristics of the reflective path relative to the direct path (phase and selective attenuation);
w = angular frequency = $2\pi f$ The signature curve is obtained by varying the pair $(\Phi,\mu)$ so as to obtain a given error rate on the link (generally $10^{-3}$).

In order to obtain such a curve, the problem thus consists in setting up multiple paths: the object of the invention is thus to simulate such multiple paths by varying said transfer function which corresponds to various coefficients contained in memory.

The invention consists in using digital filtering on transmission for simulating such multiple paths. Use is thus made of a function which is already present in the network when performing qualitative measurements on the link. FIG. 2 is a block diagram of a structure in which it is possible to make use of filtering for performing signature measurements. In the following discussion, the following are assumed, by way of example:

the modulation is of the QPSK, 16QAM, 64QAM, ..., type;

filtering is performed digitally at the transmission end, with filter coefficients that are variable over different values, (i.e. the transfer coefficients used are not static); and the error rate over the link is available at all times (e.g. via a service channel).

Thus, in outline, the transmission station 10 comprises, in particular:

a digital filter circuit 15 whose coefficients are contained in memories 16, e.g. ROM, under the control of an address generator circuit 17; and a modulator and transmission circuit 18 for converting to intermediate frequency, and then to microwave frequency, followed by a transmission antenna 19.

The receiver station 11 which receives the transmitted signal comprises, in particular:

an antenna 20 followed by a reception and demodulation circuit 21;

a circuit 22 for recovering the received frame which contains both useful information and extra bits; and an error rate recovery circuit 23.

For a service channel, the receiver station 11 acts as a transmitter station including:

a circuit 24 for obtaining the transmission frame; and a circuit 25 for modulating the frame, and transmitting it via an antenna 26.

With respect to the service channel, the first or transmitter station 10 includes, in particular:

an antenna 27 followed by a receiver and demodulation circuit 28; and a received frame recovery circuit 29 which controls the memory address generator circuit 17.

The coefficients for the transmitter digital filter 15 at the transmitter station 10 are contained in high speed memories 16 (RAM or ROM). By acting on the addressing of these memories, the transfer function of the filter may be varied. Multiple paths can thus be simulated. Let M be the total number of filter coefficients. Each group of M coefficients represents a certain transfer function (in amplitude and phase) corresponding to a particular pair ($\phi,\mu$). The memory address generator circuit 17 converts the information COM it receives at its input into memory addresses. The signals COM come from the station 11 via the service channel. The principle on which the measurement is based is to select groups of M coefficients for which the error rate over the link has a predetermined value: generally $10^{-3}$. The pairs ($\phi,\mu$) obtained in this way can then be used for tracing the signature curve. The capacity of the memories depends simultaneously on the length of the digital filter, on the number of measurements possible as a function of frequency (parameter $\phi$), and on the quantification step size of the selective attenuation (parameter $\mu$). Signature curves generally look like the curves shown in FIG. 3.

The four signature curves shown in this figure correspond to four different error rates TE:

the curve 30 corresponds to an error rate TE = $10^{-6}$;

the curve 31 corresponds to an error rate TE = $10^{-3}$;

the curve 32 corresponds to an error rate which is too high for synchronization to be possible (loss of lock); and the curve 33 to an error TE corresponding to regaining lock after it has been lost.

In order to obtain such signature curves at different successive frequencies, fading depths are varied until the error rate becomes equal to a predetermined value, e.g. $10^{-3}$, and the corresponding fading depth is then stored. A set of points is thus obtained corresponding to a given error rate.

The same procedure may be performed for some other error rate (or for loosing lock and regaining lock) with the new sets of values being stored.

If it is desired to measure the signature accurately, a large number of configurations are required (in general this is done on a test platform with a multipath simulator). However, when checking rather than measuring the signature of an equipment (e.g. in order to verify that a time equalizer is operating), relatively few phase values $\phi$ (equivalent to frequency values) may suffice.

The results may be used in either of the stations 10 and 11. It is also possible to envision measuring the signature of a leg from an intermediate station belonging to the link.

When not simulating multiple paths, the filter 15 returns to its primary function of providing the Nyquist transfer function in whole or in part.

Figure 4:
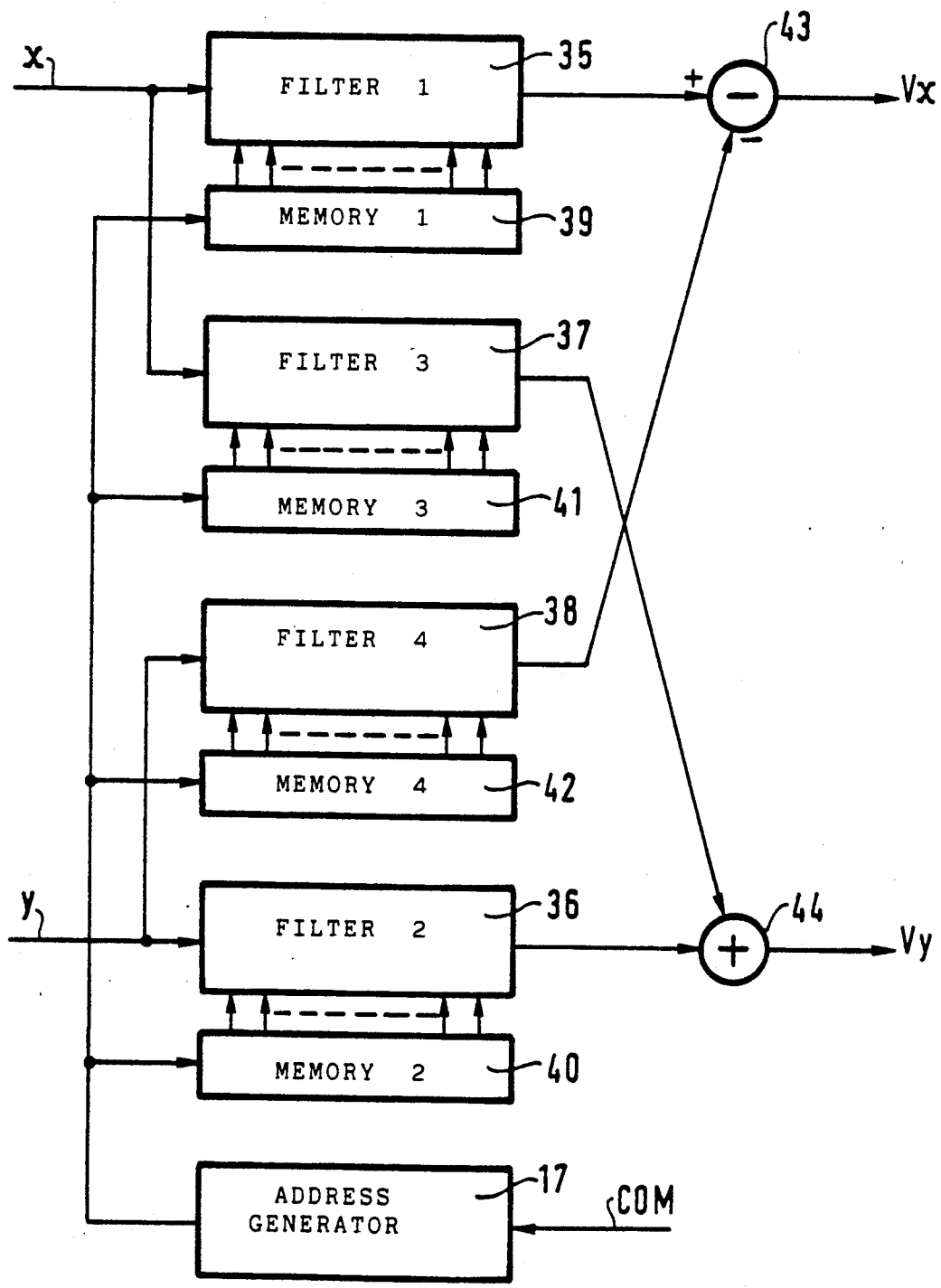
FIG. 4 is a block diagram of apparatus for implementing the method.

FIG. 4 shows such a digital filter having a crossover structure, thereby enabling corrections to be made to group propagation times on the intermediate frequency signal (IF) and enabling multiple off-center paths to be provided. In order to simulate multiple paths, two blocks of identical structure are used, but they are associated with different coefficients. Four digital filter cells 35, 36, 37, and 38 are thus obtained respectively associated with two memories 39 and 40 for direct coefficients and with two memories 41 and 42 for quadrature coefficients.

Interaction is thus obtained between the two channels X and Y which are input respectively to the two filter cells 35 and 37 (or 36 and 38). The outputs from the first and the fourth cells 35 and 38 are respectively applied to the positive and negative inputs of a subtractor 43, and the outputs from the second and the third cells 36 and 37 are applied to respective inputs of an adder 44.

By crossing over the X and Y channels, asymmetrical spectra can be created, thereby obtaining the following transfer functions:

$$H_X(w) = H1(w) - jH3(w)$$

$$H_Y(w) = H4(w) - jH2(w)$$

where H1, H2, H3, and H4 correspond to the four filter cells.

The circuit 17 for generating addresses in the memories 39, 40, 41, and 42 serves to generate the various different desired configurations.

Naturally, the present invention has been described and shown merely by way of preferred example, and its component parts could be replaced by equivalents without thereby going beyond the scope of the invention.

I claim:

1. A method for measuring the signature of digital transmission equipment in a communication link having the digital transmission equipment at a transmission station and receiving equipment at a receiving station, wherein the receiving the equipment continuously provides the digital transmission equipment with an error rate signal, and wherein the measurement is performed during operation without the addition of special equipment, said method comprising the steps of:

(a) transmitting an output signal of a digital filter, said digital filter providing a transfer function responsive to a plurality of coefficients stored in a memory unit coupled to said digital filter, at one of a plurality of frequencies;

(b) varying the depth of fade at said one of said frequencies so as to vary said transfer function of said digital filter under the control of an address generation circuit responsive to the error rate signal, said address circuit being coupled to said memory unit so as to select a group of said coefficients, until an error rate signal equal to a predetermined value is obtained and recording said depth of fade;

(c) selecting another one of said frequencies; and (d) repeating steps (a) through (c) until said signature is obtained.

2. A digital filter circuit for digital transmission equipment receiving a continuous error rate signal from a receiver station, the digital filter circuit providing a variable transfer function wherein a signature of the digital transmission equipment is obtained and wherein the transfer function in implemented so as to permit asymmetrical output signals; said digital filter circuit comprising:

first and second input lines;

first, second, third and fourth filter cells, wherein said first and said third filter cells are coupled to said first input line and said second and fourth filter cells are coupled to said second input line, and wherein each of said filter cells provides said transfer function;

first, second, third and fourth memory means for storing coefficients of said transfer function, each of said memory means being coupled to a corresponding one of said filter cells;

address generating means for generating an address location in said memory means storing said coefficients of said transfer function, said address generating means being operatively coupled to each of said memory means;

a subtractor receiving an output signal from each of said first and fourth filter cells, said subtractor being coupled to a first output line; and an adder receiving an output signal from each of said second and third filter cells, said adder being coupled to a second output line.

3. The digital filter circuit of claim 2, wherein said first and second memory means store direct coefficients of said transfer function and third and fourth memory means store quadrature coefficients of said transfer function.

* * * * *